United States Patent [19]
Epperson

[11] Patent Number: 4,725,013
[45] Date of Patent: Feb. 16, 1988

[54] SPINNING REEL
[75] Inventor: Frank E. Epperson, Aurora, Colo.
[73] Assignee: F.M. & G., Inc., Aurora, Colo.
[21] Appl. No.: 806,401
[22] Filed: Dec. 9, 1985

Related U.S. Application Data
[63] Continuation-in-part of Ser. No. 688,043, Dec. 31, 1984, abandoned.

[51] Int. Cl.$^4$ ............................................. A01K 89/01
[52] U.S. Cl. ......................... 242/84.21 A; 242/84.5 A
[58] Field of Search ..................... 242/84.2 R, 84.2 A, 242/84.2 D, 84.2 E, 84.2 R, 84.21 R, 84.21 A, 84.5 P

[56] References Cited
U.S. PATENT DOCUMENTS

| | | | |
|---|---|---|---|
| 2,507,457 | 5/1950 | Rix | 242/84.2 A |
| 2,652,990 | 9/1953 | Ferguson | 242/84.2 A |
| 2,711,292 | 6/1955 | Taggart et al. | 242/84.21 A |
| 2,713,463 | 7/1955 | Sarah | 242/84.2 P |
| 2,863,617 | 12/1958 | Chapin et al. | 242/84.5 P |
| 3,093,340 | 6/1963 | Mauborgne | 242/84.21 A |
| 3,095,158 | 6/1963 | Louison | 242/84.21 A |
| 3,123,318 | 3/1964 | Wood | 242/84.2 A |
| 3,298,629 | 1/1967 | Small | 242/84.2 A |
| 3,946,963 | 3/1976 | Oberg | 242/84.21 R |

FOREIGN PATENT DOCUMENTS
791808 3/1955 United Kingdom ........ 242/84.21 A Primary Examiner—Billy S. Taylor
Attorney, Agent, or Firm—John E. Reilly

[57] ABSTRACT

A fishing reel is comprised of a hollow casing, a shaft extending through the casing with a nose disposed at one end thereof and a rearwardly directed skirt in spaced facing relation to the casing defining an annular gap therebetween, an axially reciprocal line spool on the shaft with front and rear flanges, and a fishing line wound therebetween extending radially through the annular gap. A line pick-up includes a forwardly extending rod and gear mechanism for imparting rotational and axial movement thereto so as to advance the rod into the path of movement of the line for winding the line onto the line spool and for retracting the line pick-up member and rod away from the path of movement of the line. A drag control is mounted on the shaft to impart a selected adjustable amount of resistance to rotation of the line spool via guide rods between the nose and lure spool. A manually adjustable drag sleeve is mounted on the shaft and is axially movable into frictional engagement with the nose.

20 Claims, 10 Drawing Figures

SPINNING REEL

This application is a continuation-in-part of Ser. No. 688,043, filed Dec. 31, 1984, now abandoned and invented by the applicant of the present continuation-in-part application.

This invention relates to fishing reels; and more particularly relates to a novel and improved spin casting reel of the open face type which closely and accurately controls pick up and release of the line in an effective and reliable manner.

BACKGROUND AND FIELD OF THE INVENTION

Numerous approaches have been taken in the development of spinning reels in which the fishing line is drawn off of a spool in the casting of the line. Such reels are typically of the open face or closed face type; i.e., in the open face type a bail is positioned for pivotal movement into and away from outer concentric relation to the line spool but the spool is not otherwise covered or enclosed. In the closed face type, the line spool is at least partially enclosed and the line is drawn out, for example, through a central opening in the enclosure.

Representative of spinning reels of the closed face variety is that disclosed in U.S. Pat. No. 2,652,990 to D. B. Ferguson in which the fishing line is wound on a normally stationary spool and is adapted to be drawn off the end of the spool around a cylindrical guide and through an opening in the front end of a housing which encloses the spool. In order to wind the fishing line back onto the spool, a pair of pins on a winding device project in outer spaced concentric relation to the spool and the guide is shifted into a position receiving the pins so that the line is constrained to pass outwardly around one of the pins. Accordingly, as the pins rotate, the line will be forced onto the spool. In this arrangement, the guide member must be shifted away from the pins to afford clearance for forward travel of the line in permitting it to freely unwind without interference from the pins. However, there is the danger that, since the pines remain stationary, the line may become snagged on the pins in the released position when there is any slack in the line.

Other spinning reels of the closed face type are disclosed in U.S. Pat. Nos. 3,160,363 to J. M. Holahan; 3,351,301 to G. L. Bretton; 2,613,468 to J. B. Hand; 3,329,373 to G. A. Wood, Jr.; 2,879,954 and 3,298,29 to E. F. Small. In Holahan, a closed face spinning reel imparts drag by means of a frictional washer urged against holding pins. Other internal drag collar arrangements are disclosed in U.S. Patent to Wood, Jr., Hand and Small. U.S. Pat. No. 3,085,766 to E. Salmivuori discloses a level wind mechanism, and U.S. Pat. No. 2,904,281 to A. L. Jackson discloses utilization of frictional disks for bearing surfaces to create drag.

SUMMARY OF THE INVENTION

It is an object of the present invention to provide for a novel and improved spinning reel which in the casting operation permits the line to freely advance without danger of snagging on the winding mechanism.

It is another object of the present invention to provide in an open faced spining reel for a novel and improved method and means for pick-up and release of the line including a level wind mechanism for even, uniform winding of the line onto a spool in further cooperation with a drag element which can be closely controlled to impose the desired braking action on the spool; and further wherein drag can be applied to the spool independently of its reciprocal movement in achieving level or uniform winding of the line.

A further object of the present invention is to provide for a novel and improved open face, compact spinning reel of extremely durable construction which pre-positions the line and the spool at the start of the casting operation and enables positive control over the winding and unwinding of a fishing line onto and from the spool while minimizing any possibility of snarling.

It is a still further object of the present invention to provide for a novel and improved spinning reel in which a crank member is interchangeably mounted in association with a gear mechanism for lefthand or righthand operation, and further wherein an anti-reverse mechanism can be selectively activated to limit rotation of the crank member in one direction only.

In accordance with the present invention, a fishing reel has been devised which is of the open face type having a hollow casing, a shaft extending through the casing including a nose disposed at one end thereof with a rearwardly directed skirt in spaced facing relation to the casing and which defines an annular gap therebetween, an axially reciprocal line spool mounted on the shaft having front and rear flanges and a fishing line wound on the spool which extends radially through the annular gap. A line pick-up member includes a forwardly extending rod and means in the form of a gear mechanism for imparting rotational and axial movement to the line pick-up member whereby to advance the rod into the path of movement of the line for winding the line onto the line spool and for retracting the line pick-up member including the rod away from the path of movement of the line in preparation for the casting operation. A drag control member is mounted on the shaft to impart a selected, adjustable amount of resistance to rotation of the line spool independently of its reciprocation. Preferably, the resistance is imparted to the line spool via one or more guide rods between the nose and line spool, and a manually adjustable drag sleeve mounted on the shaft controls the frictional resistance of the shaft to rotation of the nose and associated line spool.

In an alternate form of invention, a line-retention member advances into engagement with the line, and spool positioning means pre-positions the spool as a preliminary to the casting operation all under control of a cast control member; and when the cast control member is released at the start of the casting operation, the line-engaging member is retracted so that the line can be freely layed out through the annular space or gap. A modified form of nose portion includes a circumferential groove in the rearwardly directed skirt to receive the leading end of the line pick-up rod so that the line is unable to slip off the end of the pick-up rod during the reeling operation.

DETAILED DESCRIPTION OF THE PREFERRED EMBODIMENT

Referring in more detail to the drawings, there is shown by way of illustrative example in FIGS. 1 to 7 a preferred embodiment of the present invention wherein a fishing reel assembly 10 is broadly comprised of an outer casing 12 which includes a fixed lateral extension at its rearward end defining a tang 14 adapted for attachment in a conventional manner to a fishing rod. The preferred form of fishing reel is of the open face type having a forward nose portion 16 releasably attached to an inner square shaft 18 which is fixed to and projects from one end of an inner tubular shaft 18', the latter shaft traversing the greater length of the assembly. A cylindrical skirt 19 forms a rearward extension of the nose and, in a manner hereinafter described, the nose portion 16 forms a part of a drag control unit to regulate the drag imposed on a line L which is coiled around an axially reciprocal line spool 20 having front and rear flanges 21 and 21'. Reciprocation of the line spool is controlled by a crank 22 which projects from one side of the casing 12, and the amount of drag imposed on the line spool 20 is controlled by a threadedly adjustable drag control dial or button 24 at the rearward end of the casing which regulates the force of a compression spring 25 against a flat ring or washer element 26' fixed on the end of a drag sleeve 26, the latter disposed in outer concentric relation to the shaft 18' and traversing the greater length of the assembly.

Figures 2, 3, 8:
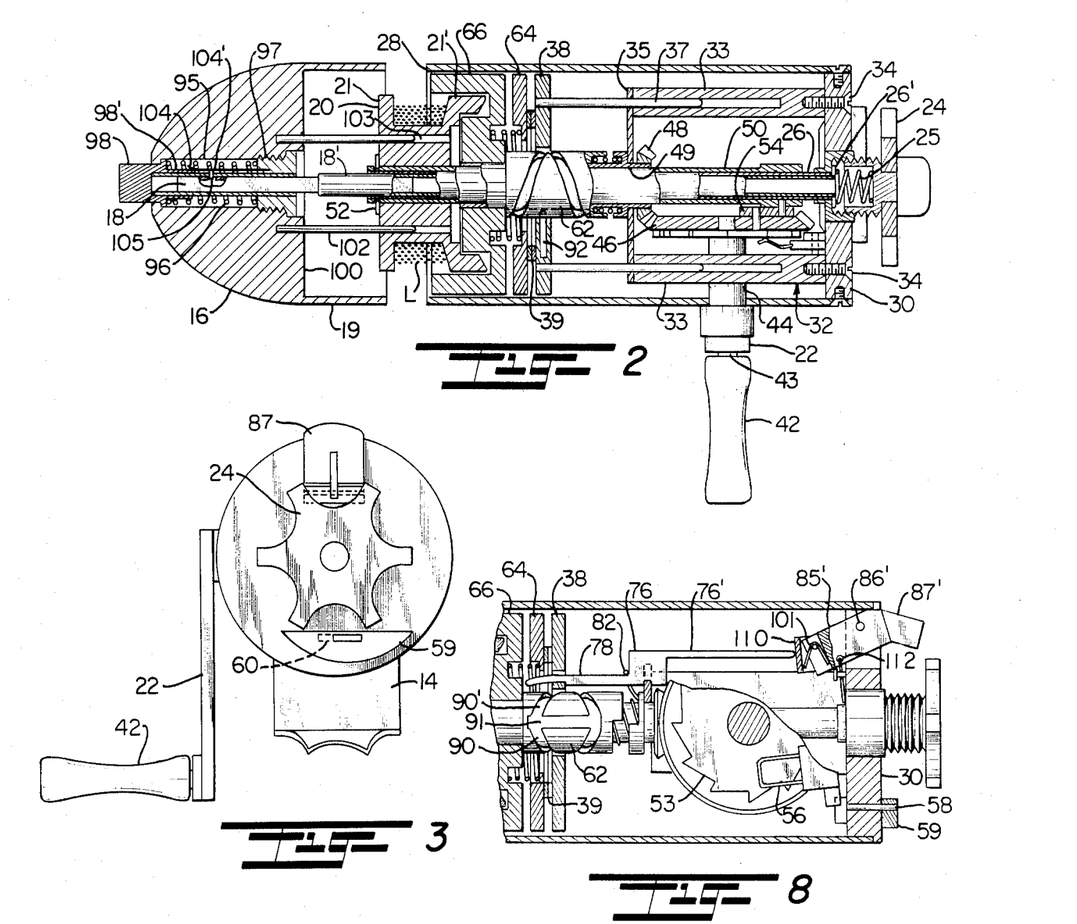
FIG. 2 is a cross-sectional view of the preferred embodiment taken along lines 2—2 of FIG. 1.
FIG. 3 is an end view taken at lines 3—3 of FIG. 1.
FIG. 8 is a somewhat fragmentary view of a modified form of thumb control button for the line pick-up assembly.

It will be noted that the casing 12 is of generally hollow cylindrical configuration and terminates in an open end 28 disposed in facing relation to the skirt 19, and a rear end wall 30 supports a frame 32 internally of the casing. The frame 32 includes diametrically opposed, longitudinally extending support brackets or bars 33, each fixed by a suitable fastener 34 to the rear end wall for forward extension therefrom, and the forward ends of the bars 33 are interconnected by a transverse brace 35 through which the shaft 18' and sleeve 26 extend. Each bar 33 is provided with a counterbore for slidable insertion of a rod 37 which extends rearwardly from a disk 38. The crank 22 is of conventional construction having a handle 42 journaled on a shaft 43 which forms one end of the crank 22, the opposite end defining an offset shaft 44 projecting through the wall of the casing 12 and one of the support brackets 33 for connection to a circular gear 46. The circular gear teeth intermeshingly engage a bevel gear 48 which is mounted on bushing 49, the bevel gear 48 being located just rearwardly of the brace 35 of the frame 32, and the bushing 49 is disposed in outer concentric relation to a mounting sleeve 50. The mounting sleeve 50 is disposed for lengthwise sliding movement on the drag sleeve 26 and extends forwardly from the rearward end of the casing through the line spool 20, and a ring 52 is affixed to the end of the spool 20 and snap-fit into a groove at the end of the sleeve 50 thereby interconnecting the spool 20 and sleeve 50 and causing the line spool 20 to follow the reciprocal movement of the mounting sleeve 50. The gear 46 is connected to the mounting sleeve via rotary-to-linear motion linkage in the form of a pivot link 54 whereby rotational movement of the gear in response to rotation of the crank arm 22 imparts linear reciprocal motion to the mounting sleeve 50 and to the line spool 20 which follows the reciprocal movement of sleeve 50 but is journaled thereon so as to be free to rotate independently of the sleeve.

Figure 7:
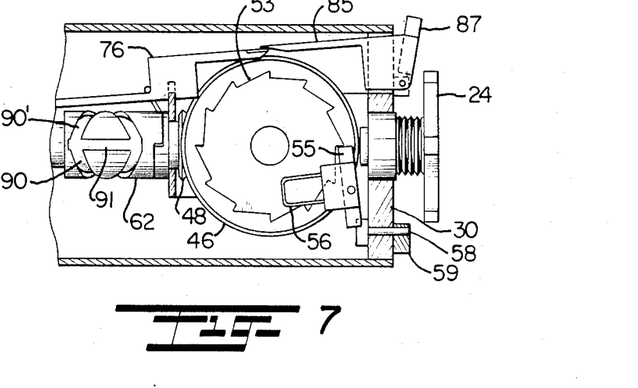
FIG. 7 is a fragmentary view in section illustrating in more detail the anti-reverse mechanism forming a part of the preferred embodiment of the present invention.

A ratchet 53 is mounted on the outer face of the circular gear 46 and cooperates with a spring-loaded dog 55 which is mounted on one of the brackets 33 to limit, when desired, rotation of the crank to one direction only. This anti-reverse mechanism and specifically the dog 55 is normally urged into the path of the teeth of the ratchet 53 by a spring element 56. In order to deactivate the anti-reverse mechanism, a release member 58 is connected through a slot 60 in the wall 30 to a control handle 59 located externally of the rear wall. The handle is laterally shiftable to cause the release member to move over into the path of the dog 55 so as to retain it in spaced relation to the path of movement of the rotary-to-linear motion linkage 54 and permit rotation of the gear 46 in either direction.

Considering in more detail the line pickup control mechanism, a worm gear 62 is fixed for rotation on the bushing 49 and extends forwardly from the forward end of the frame 32 through a central opening in the disk 38 and through central openings in a second disk 64 and a hub 66. The hub 66 is keyed for rotation on the bushing 49 and imparts rotation to the disk 64 by means of slidable pick-up rods 67 and 68 which extend forwardly from the disk 64 through circumferentially spaced longitudinal bores in outer wall section 69 of the hub. A coiled spring 70 is mounted under compression between the disk 64 and hub 66, and an inner concentric coiled spring 72 is mounted under compression between the worm gear 62 and a worm actuator 74 which is affixed to the bushing 49 on the forward end face of the brace 35 of the frame 32. It will be noted that the worm actuator 74 has a shoulder 75 which projects forwardly for engagement with a rearwardly directed shoulder 75' on the worm 62.

Figure 4:
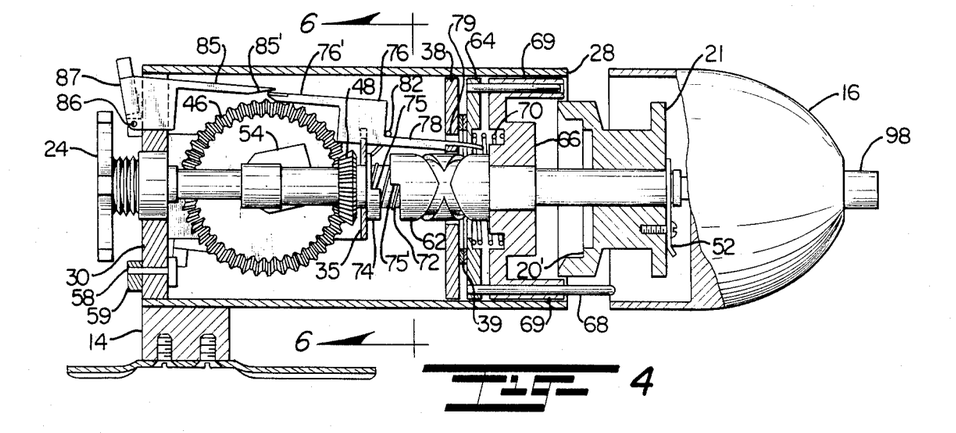
FIG. 4 is a side view partially in section of the preferred embodiment shown in FIGS. 1 to 3 with the line spool in a partially retracted, freewheeling position preliminary to cranking of the wheel.
Figure 5:
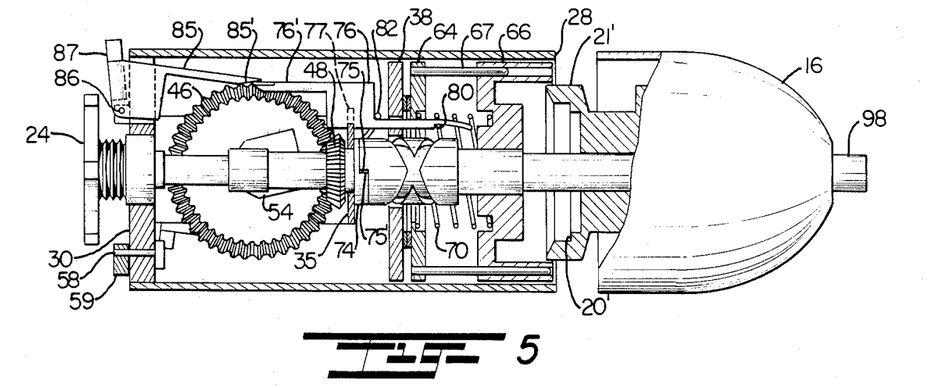
FIG. 5 is a view corresponding to FIG. 4 but illustrating the extension of the line spool into a position adjacent to the nose portion of the reel assembly.
Figure 6:
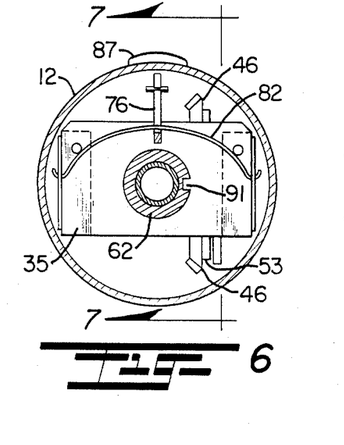
FIG. 6 is a cross-sectional view taken about lines 6—6 of FIG. 4.

A pivotal control arm 76 has an open slot 77 which is pivotally mounted on the brace 35 and includes a forwardly extending finger 78 which projects through an opening 79 in the disk 38 as well as through the central opening of the disk 64. A shoulder 80 is formed at the leading end of the arm 78 and, as shown in FIG. 4, is engageable with an edge of the disk 38 adjacent to the opening 79 when the arm 78 is pressed or urged in an inward radial direction. Inward urging of the arm is effected by a bail-like spring element 82 mounted on the brace 35 and extending over the arm 78 to normally press it inwardly toward the center axis of the assembly. A rearwardly extending lever arm 76' projects into the path of movement of a release arm 85 which is pivotally mounted as at 86 externally of the rear end wall 30. A thumb release pad 87 is affixed to the rearward arm of the lever arm 85 externally of the end wall 30 with the release arm projecting forwardly through an opening in the end wall and with its forwardmost tip end 85' resting on the rearward extremity of the lever arm 76'. Forward pressing or pivoting of the release arm 85 will cause the lever arm 76 to be tipped downwardly and thereby impart an outward radial movement to the arm 78 causing the shoulder 80 to move away from the edge of the opening 79 so that the disk 38 is free to move rearwardly under the urging of the disk 64 and attached spring 70.

As illustrated in the preferred form, the worm 62 was lefthand and righthand helical grooves arranged in criss-cross fashion as designated at 90 and 90', respectively, together with an axially directed groove 91 in communication with the helical grooves. A pin 92 projects inwardly from the disk 38 into engagement with the helical groove 90 so that, for example, when the worm 62 is rotated in either direction the disk 38 will be caused to travel in a forward axial direction away from the frame 32 and carry with it the center disk 64 against the urging of the spring 70. Specifically, this rotation is imparted to the worm 62 by the worm actuator 74 which when rotated will, in response to engagement between shoulders 75 and 75', cause the worm to rotate until the pin 92 reaches the outermost limit of travel of the groove 90 or 90' and advance into communication with the axial groove 91. When the pin 92 reaches this point the urging of the inner spring 72 will cause the worm 62 to be axially displaced from the worm actuator 74 and remain in a stationary position as illustrated in FIG. 4. However, the disks 38 and 64 will be free to move but a limited distance in a rearward direction until the disk 38 engages the shoulder 80 on the control arm 78. In this position, continued rotation of the crank will cause the line spool to move in a reciprocal direction in following the reciprocal movement of the mounting sleeve 50. At the same time, the control hub 66 will continue rotating, since it is fixed to the bushing 49. In this relation, it will be noted that one of the pick-up rods 68 projects forwardly from the hub 66 in outer spaced concentric relation to the line spool so as to control winding of the line L onto the spool 20 as the crank is rotated.

In a typical casting operation, in order to permit the line L to play or unwind freely off of the spool 20, the release button 87 is depressed to disengage the control arm 78 from the disk 38 and permit the disks 38 and 64 to be retracted away from the hub 66 and to retract the guide rod 68 out of the path of movement of the line. At the end of the casting operation, rotation of the crank 22 again will cause the worm 62 to be rotated thereby advancing the disks 38 and 64 toward the hub 66.

The drag, or degree of resistance to rotation of the spool 20, is regulated by the cooperative relationship between the drag control member 24 and the nose 16. The nose 16 has a solid body portion provided with a central bore 95 which houses a spring element 96 mounted between a threaded bearing element 97 and a retainer button 98 at the opposite end. The skirt 19 forms a rearward extension of the nose toward the open end of the casing 12 and defines a cavity therein for reciprocal movement of the line spool toward and away from a flat end face 100 on the nose. Guide control rods 102 extend rearwardly from the nose for insertion into bores 103 in the line spool 20. The nose is releasably mounted on the square shaft 18 by means of a spring clip 104 which has a slight radial inward projection 104' which will normally snap into engagement with a groove 105 in the shaft. However, when the retainer button 98 is depressed, a rearward sleeve-like extension 98' on the button is advances rearwardly beneath the spring clip 104 to force the spring clip 104 to be urged radially outwardly until the projection 104' is released from the groove 105 whereby to permit the nose to be removed from the shaft.

In order to regulate the drag imparted by the nose on the rotation of the spool, the drag sleeve 26 will frictionally resist the rotation of the shafts 18 and 18' to a degree dependent upon the inward threaded adjustment of the drag control member 24. Thus, the greater the spring tension exerted by the spring element 25 the greater the resistance to rotation imparted to the line spool via the slide rods 102 on the nose. Accordingly, in the relationship shown in FIG. 5, when the thumb release button 87 is depressed to retract the disk and attached rods 67 away from the hub 66 in casting the line L, the nose will impart the desired degree of drag to the line spool 20, dependent upon the setting of the drag control dial 24.

As a preliminary to casting, the drag control dial 24 is preset as described and, during the forward delivery of the reel, the release button 87 is depressed to play out the line from the line spool 20. At the end of the cast, the crank arm 40 is rotated as described in impart rotation to the worm gear 62 via the bevel gear 48 and worm actuator 74 whereby to advance the disks 38 and 64 forwardly in an axial direction until the longer of the slide rods 68 advances into position over the line spool 20. An annular bearing 39 between the disks 38 and 64 serves to permit relative rotation of the disk 64 with respect to the non-rotating disk 38. Again, the hub 66, which is keyed to the disk 64 through the guide rods 67, is rotated by the bevel gear 48 through bushing 49 in response to turning of the crank 22.

In order to reel in the line L, continued rotation of the crank 22 will via the rotary-to-linear motion linkage 54 cause the sleeve 50 and attached line spool 20 to reciprocate in an axial direction along the guide rods 102 or, in other words, between the position shown in FIG. 2 and that shown in FIG. 4. The hub 66, being keyed for rotation on the drive bushing 49, will continue to rotate the longer rod 68 as long as the crank is rotated so that the rod 68 causes the line L to be rewound upon the line spool 20 as the latter continuously undergoes reciprocal movement or "level-winding" to evenly wind the line L onto the spool. At the end of the cranking operation, the disks 38 and 64 will have remained in the outermost position as illustrated in FIG. 4 by virtue of the control arm 78 engaging the disk 38. In order to cast the line, depression of the button 87 will release the disks 38 and 64 to return under the urging of spring 70 to the position shown in FIG. 5 and in this way remove the pick-up rod 68 from the path of movement of the line L.

Figure 1:
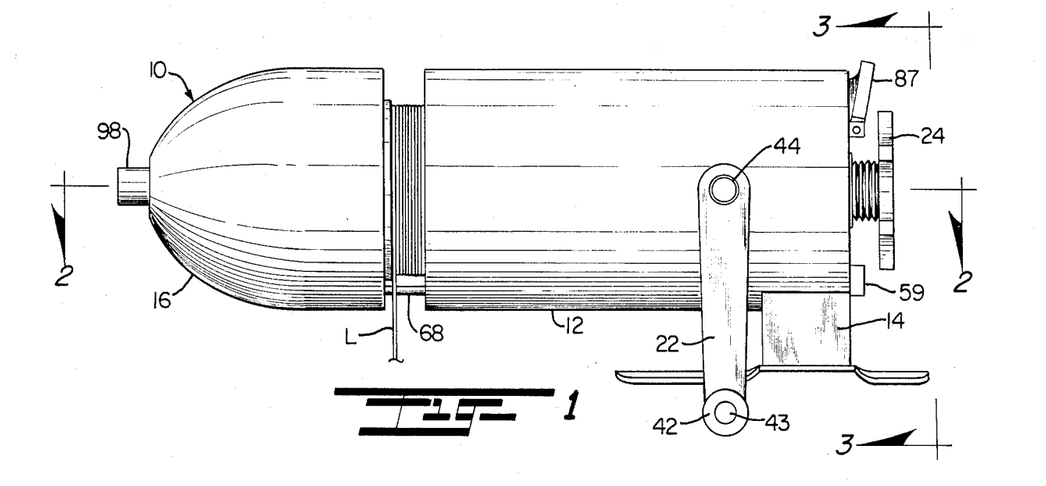
FIG. 1 is a side elevational view of a preferred form of fishing reel in accordance with the present invention.

In the reel assembly illustrated in the preferred embodiment, the crank 22 is mounted on the lefthand side of the casing, as viewed in FIGS. 1 and 2 for lefthand operation of the crank. In order to modify the reel assembly for righthand cranking, it is merely necessary to remove the crank from the lefthand bracket 33, shift the circular gear 46 180° into facing relation to the righthand bracket and to reinsert the crank shaft 44 through an opening in the righthand bracket. As illustrated in FIG. 2, the worm 62 is provided with lefthand and righthand grooves 90 and 90', respectively, to permit interchangeable mounting of the crank without replacing the worm gear 62. Thus, when the crank is mounted on the righthand side of the assembly, the pin 92 on the rearwardmost disk 38 will advance along the lefthand helical groove 90 as the crank 22 is rotated. Moreover, in shifting the anti-reverse mechanism 55 to the righthand side of the end wall 30, a different ratchet member must be substituted for the ratchet 53 so that the ratchet teeth are reversed or face in an opposite direction to those as illustrated in FIG. 7. In the alternative, the ratchet 53 may be provided with square teeth so as to permit interchangeable mounting along with the anti-reverse mechanism 55.

As previously noted, the thumb release button 87 is depressed at the beginning of the casting operation to retract the rod 68 away from the path of the line L. As shown in FIG. 8, this procedure may be reversed by utilizing a modified form of release arm 85' which is pivotally connected as at 86' to the rear wall 30 and caused to pivot radially and outwardly in response to depression of the release button 87'. In this form, the arm 85' has a spring-loaded pivotal end portion 110 which is biased against the end of the arm portion 76' by a torsion spring 101; and, under the influence of a bale-like spring element 112, the end portion 110 normally urge the arm 78 outwardly away from engagement with the disk 38. However, when the button 87' is manually depressed, the end portion 110 is pivoted outwardly past the arm portion 76' so that the control arm 78 is free to pivot inwardly into engagement with the disk 38 under the urging of the spring 82 when the disk 38 is advanced forwardly by the crank 22. Accordingly, the button 87' must be depressed at the end of the casting operation rather than at the beginning of the casting operation as in the preferred form whereby the arm 78 is movable into the locked position after the disk 38 has been advanced forwardly by the crank 22. When the button 87' is released, the spring element 112 will overcome the urging of the bale 82 to reverse the pivoting of the arm 76 and release it from engagement with the disk 38, such as, at the beginning of a casting operation, and the disks 38 and 64 are then free to spring rearwardly to retract the pick-up rod 68 out of the path of the line L.

DETAILED DESCRIPTION OF ALTERNATE FORM OF INVENTION

Figure 9:
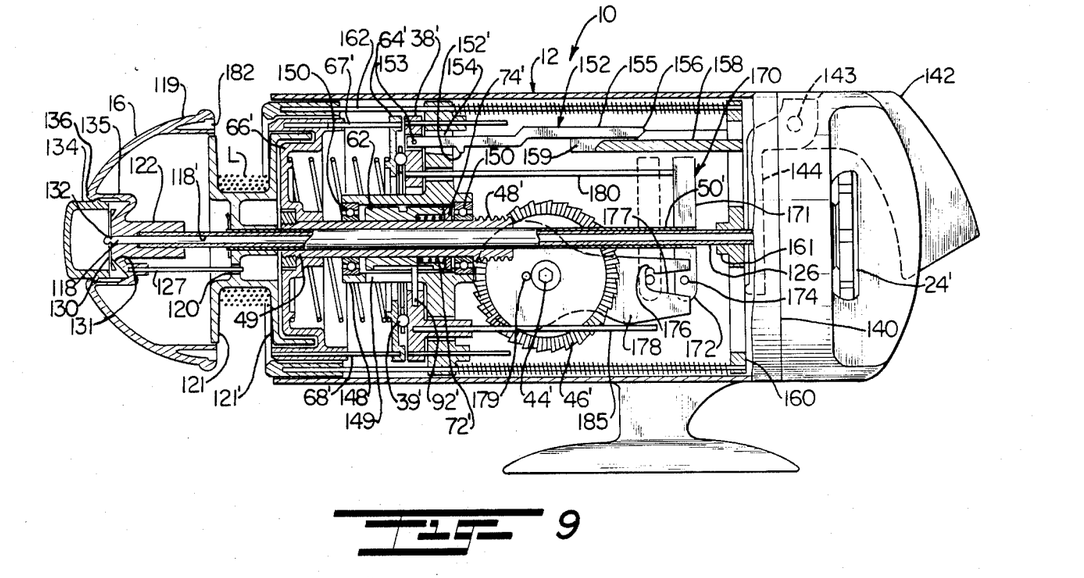
FIG. 9 is a side view partially in section of an alternate form of invention illustrating the relationship between parts in the casting position.
Figure 10:
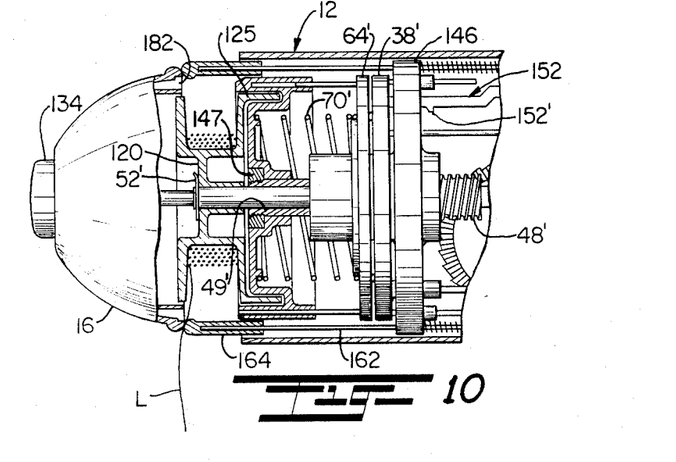
FIG. 10 is a fragmentary view partially in section showing the relationship between parts as a preliminary to the casting operation.

In the form of invention illustrated in FIGS. 8 and 9, like parts are correspondingly enumerated to those of the preferred form; and similar part are designated with prime numerals. Again, an open-faced fishing reel assembly 10 has a hollow casing 12, a cylindrical shaft 118 extending along the central axis of the casing and for a limited distance therebeyond for releasable connection of a nose 16 at one end of the shaft 118 projecting from one end of tubular shaft 118'. A sleeve member 126 is disposed in outer concentric relation to the shaft and terminates at a point just short of the end of the shaft 118' which projects beyond the casing. In turn, the nose 16 has an outer, hollow convex shell defining a rearwardly directed skirt 119, and a central hub 122 is inserted over the end of the shaft 118 to frictionally engage the sleeve 126. A leaf spring 130 is positioned at the outer end of the hub 122, the spring having a central opening which is bordered by inner split spring segments 131 which face inwardly toward one another and are insertable in a groove 132 at the end of the shaft 118 to releasably attach the nose 16' thereto. A pushbutton 134 is insertable into a recessed portion 135 at the leading end of the nose 16, and an outer cylindrical wall 136 of the button 134 is attached to the outer ends of the spring 130. When the button 134 is depressed it will force the inner spring ends 131 away from engagement with the groove 132 so as to release the nose from the end of the shaft, for example, when it is desired to change the spool 120.

In order to impart drag to the spool 120, a guide control rod 127 is directed rearwardly in an axial direction from the inner wall of the recessed portion 135 for insertion into a bore in the spool as shown. Accordingly, when the nose 16' is placed over the end of the shaft 118, it is necessary to align the guide control rod 127 with the bore in the spool 120 so as to impart the desired amount of drag to the spool in the same manner as described with reference to the preferred form. The casing 112 is of elongated hollow construction having a rear end wall 140, and the rearward end of the shaft 118 is supported in journaled relation to the end wall 140 in alignment with a drag control dial 24'. The drag on the line spool 120 is regulated by threaded adjustment of the drag controld ial 24' in the same manner as described in the preferred form. A cast control member 142 is pivotally mounted as at 143 to the rearward end of the casing and has a downwardly directed lever arm 144 positioned within the interior of the casing directly in front of the end wall 140 for a purpose to be described.

A stationary support frame 146 is mounted within the casing to serve as the principal intermediate support for the helical drive 62 and central shaft member 118' as well as to serve as a guide for other elements of the reel assembly in a manner to be described. To this end, the frame 146 takes the form of a circular disk which terminates in a central sleeve 148 having a longitudinal groove 149 therein. Again, in a manner corresponding to that described in the preferred form, a conventional crank, not shown, has a shaft 44' which projects through the wall of the casing for connection to a circular gear 46', the circular gear 46' intermeshingly engaging a gear member 48' which is journaled by suitable ball bearings 150 with respect to the sleeve 148 and which imparts rotation via a worm actuator generally designated at 74' to a helical drive member 62, 62' in a manner corresponding to that shown and described with reference to FIGS. 4 and 5. Again, the worm gear 62 is fixed for rotation on a bushing 49' which extends forwardly from the gear member 48' through sleeve 148 and is keyed for rotation to the hub 66' by a nut 147 threaded ontot he end of bushing 49. A pair of disks 38' and 64' are disposed in outer concentric relation to the sleeve 148 and undergo axial movement along the sleeve under the control of pin 92' which projects through groove 149 into engagement with the helical drive 62; and further the disk 64' is connected for rotation with the hub 66' by slidable pick-up rods 67' and 68'. A coiled spring 70' is mounted under compression between the disks 64' and 66', and an inner concentric coil spring 72' is mounted under compression between the actuator 74' and helical drive 62'.

A pivotal control arm or sear 152 extends from pivotal connection as at 153 to the traveling disk 38' rearwardly through a guide slot 154 in the frame support 146 to terminate in an offset free end 155 having a beveld extremity 156. A pin 92' projects inwardly from the disk 38' into engagement with the helical drive 62' so that rotation of the helical drive 62' will cause the disk 38' to advance against the urging of the spring 70' in a forward, axial direction away from the frame 146 and carry with it the disk 64'. At the same time, the pivotal control arm 152 will follow the forward axial advancement of the disk 38' until a projection 152' on the arm 152 clears the front edge of guide slot 154. The carrier bracket 160 is of generally circular configuration and has a central hub 161 mounted on an intermediate sleeve 126 between the shaft 118 and sleeve 50', the hub 162 being journaled with respect to the sleeve and free to be advanced forwardly along the sleeve 126 under the urging of the downwardly directed lever arm 144 of the cast control member 142. A release arm 158 extends forwardly from the carrier bracket 160 and has an axially directed, open slotted end portion 159 at its forward end which is sized to permit the free end 155 of the pivotal control arm 152 to drop into the slot 159 when the disk 38 is advanced forwardly. In this relation, the projection 152' will engage the front surface of the frame 146 to prevent rearward movement of the arm 152 until positively released by the release arm 158 in a manner to be described.

In the modified form of invention, spring-loaded rods 162 are mounted at spaced intervals around the outer periphery of the bracket 160 and extend the substantial length of the casing through bores in the intermediate frame 146 for connection to a line-engaging ring 164 at the forward end of the casing and in facing relation to the rearwardly extending skirt 119 on the nose 16. When the case control member 142 is depressed, it will advance the carrier bracket 160 to drive the ring 164 forwardly into abutment with the rearward edge of the nose 16 so as to pinch or hold the line L therebetween and avoid possible snarling of the line L as a preliminary to the casting operation. The rods 162 are spring-loaded by return springs 163 so that when the cast control member 142 is released the ring 164 is retracted out of the path of line L and moved rearwardly with the carrier bracket 160.

In order to control "level winding" and the position of the spool 120 during the casting operation, the spool 120 is mounted at the end of the sleeve 50' by means of a washer 52' in the same manner as described in the preferred form. The sleeve 50' is disposed in outer concentric slidable relation to the shaft 118' and has front and rear flanges 121 and 121', the rear flange 121 including a rearwardly directed extension skirt 125 nested in hub 66', and fishing line L is wound on the spool 120 for extension radially through the annular gap between the rearward end of the nose skirt 119 and the front edge of the casing 12. The sleeve 50' extends rearwardly for the greater length of the shaft 118' and terminates adjacent to the rearward end of the casing 12. In order to convert the rotary motion of the crank into linear reciprocal motion of the spool 120, an abutment member 170 is affixed to the rearward end of the sleeve 50' and has an upwardly directed leg portion 171 and a downwardly directed leg portion 172, the latter having a transversely extending pin 174 engageable with an offset or catch 176 at the inner convergent end of a rearwardly divergent slot 177 formed in each of a pair of yoke members 178. The yoke members 178 extends rearwardly from their eccentric connection at 179 to opposite sides of the circular gear 46' for the reel along opposite sides of the abutment member 170 so that opposite ends of the pin 174 are in the path of travel of the slots 177 and retained in the offset slots 176. A rod 180 extends rearwardly from the disk 38' and during the cranking operation, the traveling disk 38' is advanced forwardly so that the rod 180 is held out of the path of movement of the abutment member 170. Cranking of the reel imparts eccentric movement to the yoke members 178 and, since the pin 174 is normally retained in the offset slots 176, is translated into linear movement of the abutment member 170 thereby causing the attached sleeve 50 to reciprocate the spool 120 for "level winding" movement.

It is desirable that the spool be retracted rearwardly to center it beneath the gap and minimize any fouling of the line at the beginning of each casting operation. To this end, when the cast control member 142 is depressed, the projection 152' on the sear or pivot control arm 152 is released from engagement with the frame 146 by advancing the leading end of the release arm 158 against the beveled end 156 of the arm 152 and causes it to be lifted whereby the projection 152' will clear the slot 154 and the traveling disk 38' can advance rearwardly under the urging of the spring 70; the rearwardly directed rod 180 then moves into engagement with the abutment member 170 and forces it and the attached spool 120 rearwardly into proper centered position. As noted, when the cast control member 142 is depressed to permit rearward movement of the traveling disk 38', a yoke-engaging rod 185 on the disk 38' is advanced against the underside of the yoke is lift it a limited distance in order to remove the catch 176 from engagement with the pin 174. When the cast control member 142 is released, the pinch ring 164 is retracted by the spring-loaded rods 164 away from the annular gap so as to free the line L for the casting operation or, in other words, to reestablish the annular gap for free movement of the line off of the spool. The abutment rod 180 moves into engagement with the abutment member 170 to retract the spool 120 into a centered position with respect to the gap so that the line L will freely pass off of the free-wheeling spool when the cast control member 142 is released. In advancing into engagement with the abutment member 170, the release rod 180 will cause the pin 174 to move rearwardly along the surfaces of the slots 177 until the disk 38' moves into engagement with the frame 146. After each cast, when the reeling operation is initiated by turning the crank, the yoke members 178 will travel rearwardly until the catches 176 once again pick up the pin member 174 and attached abutment member 170 to cause the abutment member 170 to follow the eccentric movement of the yoke members 178 and translate that movement into axially reciprocal movement of the spool 120 as described.

A modified form of line pick-up member includes a forwardly extending rod 68' which is aligned with a circumferential groove 182 in the rear end wall of the nose 16' and which is advanced into the path of movement of the line L for winding the line onto the line spool by forward advancement of the disk 38' by the helical drive 62'. In this way, the line L' cannot accidentally clear the end of the rod 68' as it is being wound onto the spool 120. Again, the necessary rotational movement is imparted to the line pick-up rod 68' by the hub 66' which is driven by the gear member 48'. The line pick-up member is retracted out of the path of the line L by depression of the cast control 142 at the rear end of the casing 12 to release the pivotal control arm 152 from the release arm 158 and permit the disks 38' and 64' to be forced rearwardly by the return spring 70'.

Briefly summarizing the sequence of movement in the casting operation, as the reel is taken back in preparation for a cast, the cast control button 142 is depressed to advance the pinch ring 164 forwardly against the rear end of the nose 16 and pinch the line L therebetween, as shown in FIG. 9, and the spool 120 is simultaneously retracted into alignment with the gap which is temporarily covered by the pinch ring 164. However, when the cast control member 142 is released, the pinch ring 164 is retracted and during forward delivery of the reel assembly the line is played out over the rounded, rearward end of the nose 16. Upon completion of the cast, the crankshaft 44 is rotated to rotate the circular gear 46 so as to advance the disks 38' and 64' forwardly until the pick-up rod 68' is aligned in position over the line spool 120. This forward advancement will cause the abutment rod 180 to move forwardly away from the abutment member 170 as well as to cause the lower release rod 185 to clear the underside of the yoke member 178. Continued rotation of the crankshaft 42' will cause eccentric movement of the yoke 178 to reestablish engagement between the abutment pin 174 and slot portions 176 thereby initiating reciprocal movement of the spool 120. At the same time, the hub 66' which carries the pick-up rod 68' is rotated to rewind the line L into the line spool 120 as the spool undergoes reciprocal movement or "level winding". At the end of the reeling operation, the disks 38' and 64' will have remained in their forwardmost position by reason of the projection 152' on the control arm 152 moving into engagement with the front edge of the frame 146. However, the control arm 152 is released to permit retraction of the disks 38' and 64' by advancement of the release arm 158 into engagement with the free end 155 of the control arm as a preliminary to the next casting operation.

It will be appreciated from the foregoing that while preferred and alternate embodiments of the present invention have been herein shown and described, that other modification and changes may be made therein without departing from the spirit or scope of the invention as defined by the appended claims.

I claim:

1. In an open face spinning reel, the combination comprising:
   a hollow casing;
   a shaft extending through said casing and a nose disposed at one end of said shaft;
   a line spool including means mounting said spool for axially reciprocal movement on said shaft, said spool having front and rear flanges and a fishing line wound between said flanges, said fishing line extending radially from said spool along a radial path of movement away from said spool;
   line pick-up means including an axially extending rod disposed in radially spaced, parallel relation to the longitudinal axis of said shaft, and line control means for axially advancing said rod into the path of movement of said line for winding said line onto said line spool and for retracting said rod away from the path of movement of said line; and
   drag control means to impart a selectively variable amount of resistance to rotation of said spool.

2. In a spinning reel according to claim 1, at least one guide rod extending in outer spaced parallel relation to said shaft between said nose and said line spool, and said drag control means including a manually adjustable drag member mounted on said shaft.

3. In a spinning reel according to claim 2, each said guide rod extending from said nose and inserted into an aligned bore in said line spool.

4. In a spinning reel according to claim 2, said drag control means including a spring, an external dial engageable with said spring to adjustably control the amount of frictional engagement between said drag member and said shaft.

5. In a spinning reel according to claim 1, said nose including a rearwardly directed skirt in spaced faced relation to said spool to define an annular gap therebetween for movement of said line.

6. In a spinning reel according to claim 1, said nose including means releasably connecting said nose to one end of said shaft.

7. In a spinning reel having an open-ended hollow cylindrical casing and a frame disposed therein, the combination therewith comprising:
   a shaft mounted on said frame for lengthwise extension along the entral axis of said casing and drag control means associated with said shaft;
   a nose portion mounted on said shaft having a rearwardly extending skirt in axially spaced facing relation to the open end of said casing defining an annular space between said skirt and said casing;
   a crank member, a sleeve disposed on said shaft, and means associated with said crank for axially reciprocating said sleeve along said shaft in response to rotation of said crank;
   a line spool having a line wound thereon and disposed for advancement through the annular space between said skirt and said casing, said line spool mounted on said sleeve for reciprocal movement therewith; and
   line control means including a hub disposed in adjacent, normally spaced relation to said line spool, said hub having a pick-up rod extending axially in radially outwardly spaced relation to said line spool, and hub-advancing means mounted on said sleeve for axial advancement of said hub and said pick-up rod in response to rotation of said crank member.

8. In a spinning reel according to claim 7, a line engaging ring member disposed in outer concentric relation to said line spool, and means for axially advancing said ring member between a position out of the path of movement of the line thorugh the annular space between said casing and said skirt and an advance position traversing said annular space and engaging the rearward end of sai dnose so that said line is held between said ring and said skirt.

9. In a spinning reel according to claim 7, said drag control means including a drag sleeve in outer concentric relation to said shaft, and manually adjustable control means engageable with said drag sleeve to regulate the degree of frictional resistance to rotation of said nose and associated line spool, said hub-advancing means rotatable in response to rotation of said crank member and said hub including means engageable with hub-advancing means to translate the rotation of said hub-advancing means into axial movement of said hub thereby to advance said pick-up rod in an axial direction across said annular space into a circumferential groove in said rearwardly extending skirt of said nose portion.

10. In a spinning reel according to claim 9, said hub-advancing means operative to advance said pick-up rod between a position extending across said annular space and a retracted position away from said annular space, rotary-to-linear motion means responsive to rotation of said crank to axially reciprocate said spool between a rearward position aligned with said annular space and a forward position, and spool-positioning means engageable with said rotary-to-linear motion means in response to retraction of said pick-up rod away from said annular space to advance said spool to its rearward position in alignment with said annular space.

11. In a spinning reel according to claim 7, including a gear mechanism interconnecting said crank and said hub-advancing means and operative to rotate said pick-up rod whereby to cause said line to be wound upon said line spool, said gear mechanism including a circular gear rotatable with said crank member, and helical drive means on said reciprocal sleeve rotatable in response to rotation of said circular gear to impart axial movement to said hub-advancing means.

12. In a spinning reel according to claim 11, including a ratchet member associated with said circular gear and an anti-reverse mechanism engageable with said ratchet to limit rotation of said crank member in one direction.

13. In a spinning reel according to claim 7, said frame including means for interchangeably mounting said crank member on either side of said casing for lefthand or righthand operation.

14. An open face spinning reel comprising:
   an open-ended hollow cylindrical casing;
   a shaft mounted in said casing for lengthwise extension along the central axis thereof;
   a crank member, and a sleeve including means imparting axially reciprocal movement to said sleeve on said shaft in response to rotation of said crank;
   a line spool having a line wound thereon, said line spool disposed on said sleeve for reciprocal movement therewith;
   drag control means including a nose cone mounted on said shaft in axially spaced relation to the open end of said casing, and guide rod means lidably interconnecting said nose cone and said line spool to impart drag resistance to said spool independently of the reciprocal movement of said spool; and
   a line control member disposed in adjacent, normally spaced relation to said line spool and means mounting said line control member for rotation on said sleeve in response to rotation of said crank, said line controlmember having a pick-up rod extending in radially and outwardly spaced parallel relation to said line spool into the path of said line, and retracting means for retracting said pick-up rod out of the path of said line whereby said line is free to be released from said line spool.

15. A fishing reel according to claim 14, said retracting means for said pick-up rod defined by a spring urging said line control member in a direction away from said line spool, and actuator means operative in response to rotation of said crank member to urge said line control member and pick-up rod in a direction overcoming said spring to cause said pick-up rod to advance to an extended position in radially spaced relation to said line spool into the path of said line.

16. A fishing reel according to claim 15, a pivotal control arm movable into engagement with said line control member when said pick-up rod is in the extended position to retain said pick-up rod in the extended position, and release means engageable with said pivotal control arm to move it away from engagement with said line control member for retraction of said pick-up rod away from the path of movement of said line.

17. A fishing reel according to claim 14, said drag control means including a drag sleeve extending in outer concentric relation to and in frictional engagement with said shaft, and control means engageable with said drag sleeve to adjustably control its resistance to rotatio of said shaft whereby to impart frictional resistance to rotation of said nose and associated line spool.

18. A fishing reel according to claim 15, including gear drive means interconnecting said crank and said actuator means to rotate said line control member whereby to cause said line to be wound upon said line spool.

19. A fishing reel according to claim 18, said gear drive means including a circular gear rotatable by said crank member, a bevel gear on said reciprocal sleeve rotatable in response to rotation of said circular gear, and said actuator means rotatable with said bevel gear to impart axial movement to said line control member.

20. A fishing reel according to claim 19, including a ratchet member associated with said circular gear and an anti-reverse mechanism engageable with said ratchet to limit rotation of said crank member in one direction.

* * * * *